United States Patent [19]

Morrow

[11] Patent Number: 4,831,733
[45] Date of Patent: May 23, 1989

[54] SOLENOID TYPE NUTCRACKER

[76] Inventor: George W. Morrow, 19 Rocco Dr., Little Rock, Ark. 72209

[21] Appl. No.: 27,434

[22] Filed: Mar. 18, 1987

[51] Int. Cl.⁴ .............................................. A47J 43/26
[52] U.S. Cl. ..................................... 30/120.2; 99/578
[58] Field of Search ............... 30/120.1, 120.2, 120.3, 30/120.4; 99/571, 578, 581

[56] References Cited

U.S. PATENT DOCUMENTS

| | | | |
|---|---|---|---|
| 2,707,503 | 5/1955 | Johnson et al. | 99/578 |
| 3,841,212 | 10/1974 | Powell | 99/571 |
| 3,858,501 | 1/1975 | Pfeiffer | 99/571 |
| 4,255,855 | 3/1981 | Brazil | 30/120.5 |
| 4,520,719 | 6/1985 | Price | 30/120.2 |

Primary Examiner—Donald R. Schran
Assistant Examiner—Willmon Fridie, Jr.

[57] ABSTRACT

A piston type nutcracker with two movable jaws. A connecting rod which is threaded and atached to piston jaw and is adjustable to adapt to different size nuts. The two movable jaws move in a horizontal position until the jaws and nut enter the chamber, thereby enclosing the nut so there is no scattered shell or shell dust when nut is cracked. The solenoid is to be connected to a source of electric power and may be energized by a switch. A nut support member has a through opening which is between the jaw members in their spaced position to crack a nut and for movement to discharge a nut into a container disposed below the jaw members after the shell cracking is completed.

4 Claims, 3 Drawing Sheets

SOLENOID TYPE NUTCRACKER

BACKGROUND OF THE INVENTION

The present invention pertains to a solenoid, electric type nutcracker, wherein opposed nut engaging jaws are movable relative to each other to crack the shell of a nut. Several of the concepts described include tooth racks cooperating with pinions or levered handles as a part of a driving mechanism for crushing the shell of a nut. Those mechanisms capable of processing nuts of varying size are more complex, with a construction cost related to the complexity of concept, and none with two independent movable jaws that completely enclose nut in chamber, that ensure no scattered shells and self adjusting to any size of nut.

SUMMARY OF THE INVENTION

The most important consideration for simplifying the structure of nut crackers is the provision of a simple driving connection between the connecting rod and the movable jaws and the provision of such a mechanism is the principal object of the invention. The invention further contemplates an improved mechanism (a) in which the piston movable jaw moves in a horizontal path in response to a horizontal movement of the connecting rod (b). A construction in which the connecting rod is affixed to the movable jaw. The connecting rod is movable for quickly adjusting the sheller for use with different size or different variety of nuts. Utilizing adjustment on connecting rod as means for different size nut and closing jaws while nut is being cracked ensures preservation of nut meat and no scattered shells or dust from shell. The invention further contemplates simplicity of construction with ease of operation and utmost in efficiency.

DESCRIPTION OF THE PREFERRED EMBODIMENT

The preferred embodiment is illustrated in the accompanying drawing, in which.

Figure 1:
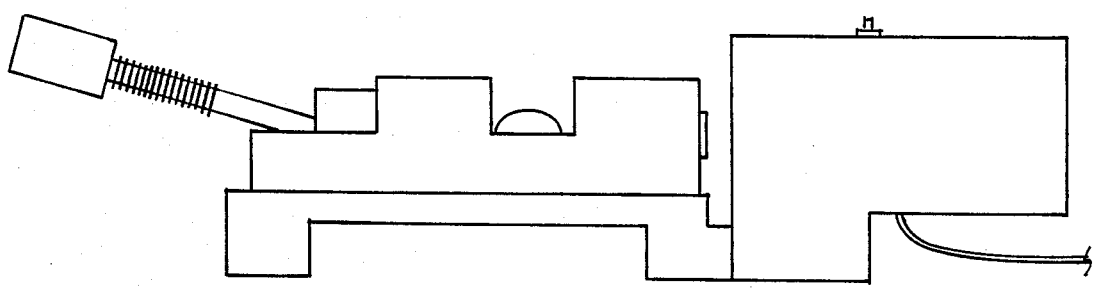
FIG. 1 is a perspective view of the invention with jaws open and nut inside.
Figure 2:
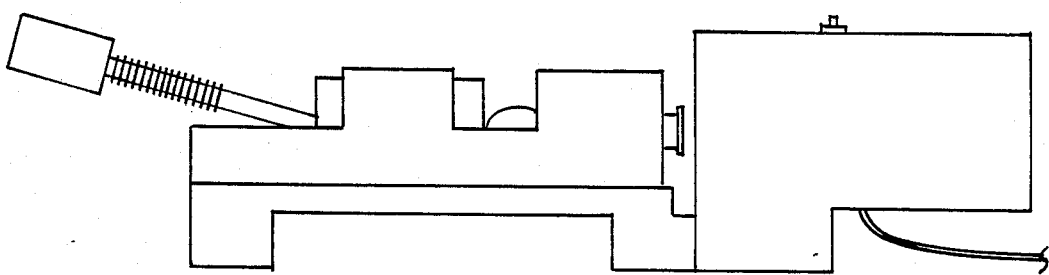
FIG. 2 is a perspective view of the invention with jaws partially closed.
Figure 3:
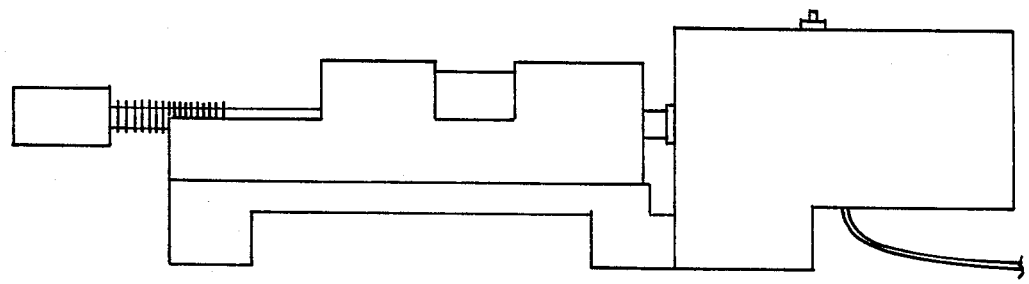
FIG. 3 is a perspective view of the invention with jaws closed, enclosing nut between jaws with connecting rod adjusted and latched in place for cracking nut.
Figure 4:
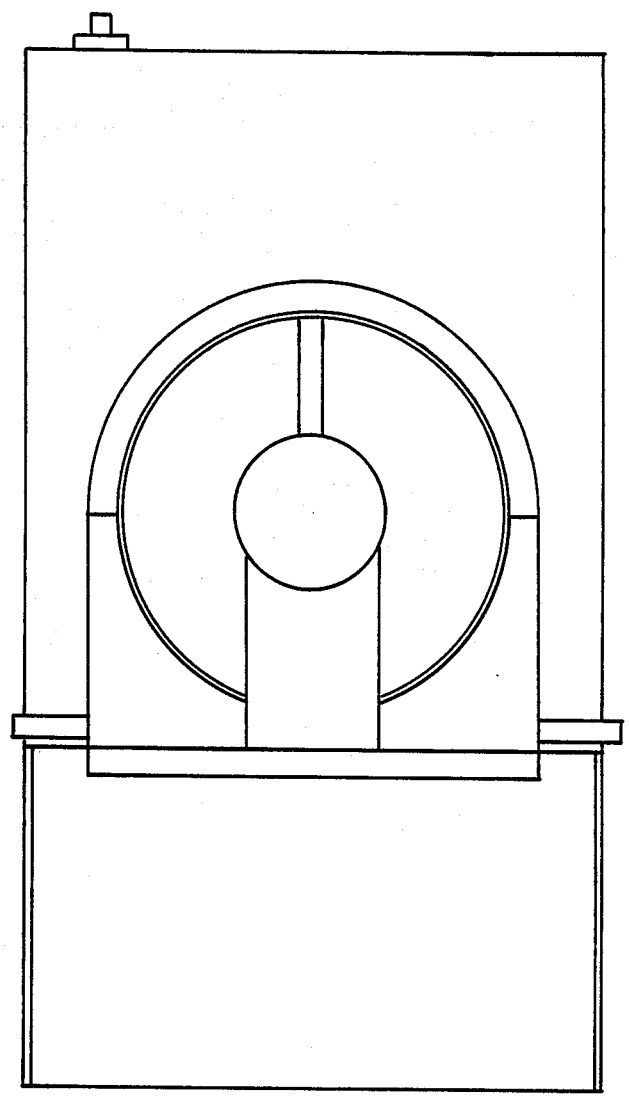
FIG. 4 is a view of the rearward end of the invention in it's entirety.
Figure 5:
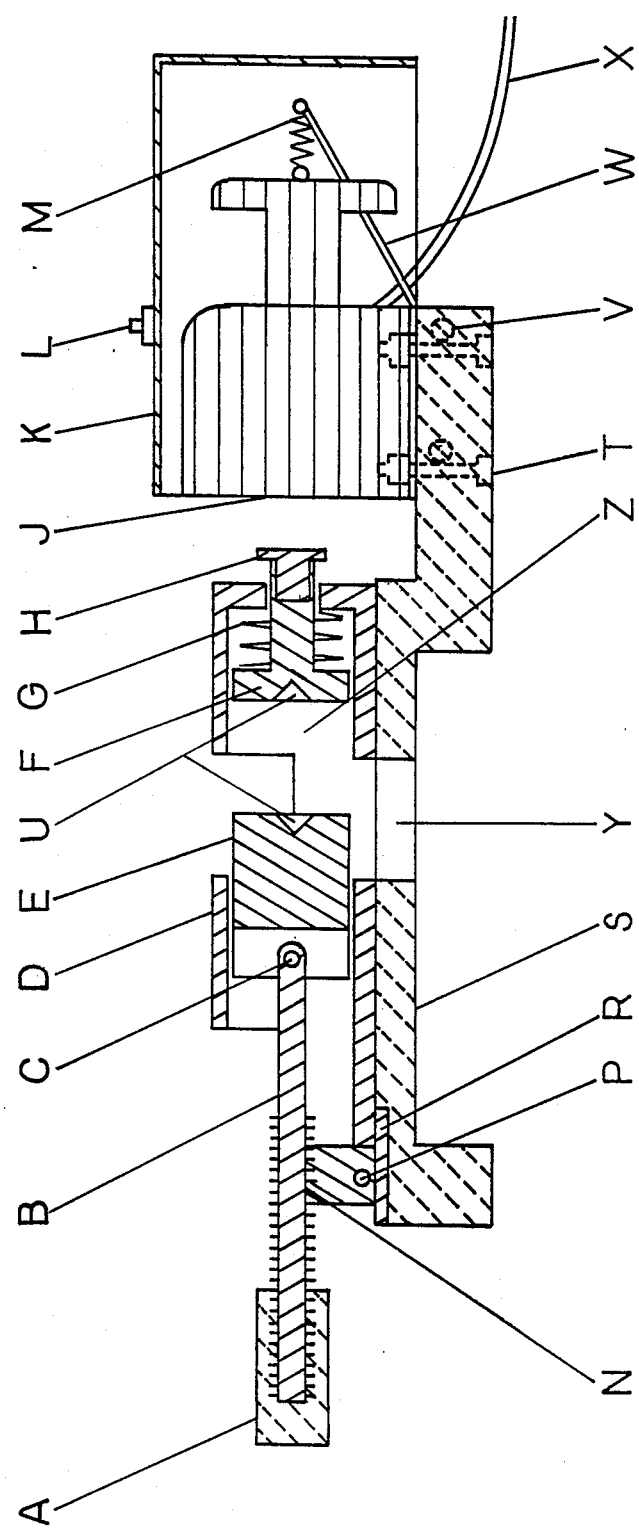
FIG. 5 is a cut away view of the entire invention.

Handle (a) is fastened to connecting rod (b) by means of threads. Connecting rod (b) fastens to piston jaw (e) with pin (c). Place nut between piston jaw (e) and floating jaw (f) into nut receiving recesses in jaws. Move connecting rod (b) and piston jaw (e) and floating jaw (f) horizontally and floating jaw (f) moves through opening in chamber (z) to end of stroke. Lock connecting rod (b) in lock (n), fastened in base (s) by pin (p). Close switch (L) to energize solenoid (j) which strikes screw and anvil (h) which is fastened to secure floating jaw (f) by means of threads. Open switch (L) is deenergize solenoid (j). Unlock connecting rod (b) and move back to loading position. Spring (g) moves floating jaw (f) to loading position which allows nut to fall through opening (y) into container under nutcracker, which is not shown in drawing. Cylinder (d), chamber (z) and base (s) are bonded together, which also is not shown.

What I claim as my invention, and desire to secure by Letters Patent of the United States is:

1. An electric solenoid nut cracker, having an elongate base with a cylinder at the rearward end of said base to house a piston jaw and a chamber at forward end of base to house a floating jaw, with an opening between said cylinder and said chamber to receive nut between said piston jaw and said floating jaw and said chamber allows said floating jaw to alternate toward and away from said solenoid and house enclosed nut at forward end of said chamber, which is rigidly secured near the forward end of said base and extending therealong in opposed space that houses said floating jaw, allowing a connecting rod to fasten to piston type jaw and to move horizontally to contact said floating jaw, which allows said connecting rod to move said floating and said piston jaw horizontally when the said floating jaw moves through said chamber to arrive at position and lock said connecting rod into a lock which is secured by means of a pin in a cut away recess in rearward end of said base, after which said solenoid is energized and strikes a anvil, which is secured to said floating jaw by means of threads, thereby releasing said connecting rod from said lock and returns said connecting rod to starting position, thereby allowing a compression spring to automatically move floating jaw to starting position and therefore pushing said nut from said chamber, which permits cracked nut to fall through opening in said base into a underneath container.

2. An electric solenoid nut cracker, as defined in claim 1, having a connecting rod and a lock, with matching threads, by which said connecting rod is then lowered into threads of said lock to secure said connecting rod in position, thereby allowing said connecting rod to adjust to any size or type of nut to be cracked.

3. An electric solenoid nut cracker, as defined in claim 1, wherein, having a chamber which encloses nut to be cracked, thereby keeping shells and dust intact during cracking operation.

4. An electric solenoid nut cracker, as defined in claim 1, having a floating jaw, with a compressed spring, which is housed in said chamber that removes said nut after cracking operation is completed.

* * * * *